US008212402B2

(12) United States Patent
Rodenhiser et al.

(10) Patent No.: US 8,212,402 B2
(45) Date of Patent: Jul. 3, 2012

(54) SYSTEM AND METHOD FOR LIMITING LOSSES IN AN UNINTERRUPTIBLE POWER SUPPLY

(75) Inventors: Fred William Rodenhiser, Wilmington, MA (US); Vishwas Mohaniraj Deokar, Acton, MA (US); Namwook Paik, Acton, MA (US); Fang Sheng-Hsien, Taipei (TW)

(73) Assignee: American Power Conversion Corporation, West Kingston, RI (US)

( * ) Notice: Subject to any disclaimer, the term of this patent is extended or adjusted under 35 U.S.C. 154(b) by 619 days.

(21) Appl. No.: 12/360,648

(22) Filed: Jan. 27, 2009

(65) Prior Publication Data
US 2010/0188066 A1 Jul. 29, 2010

(51) Int. Cl.
*H02J 9/00* (2006.01)
(52) U.S. Cl. .......................................... 307/64; 307/66
(58) Field of Classification Search .............. 307/64–66
See application file for complete search history.

(56) References Cited

U.S. PATENT DOCUMENTS

| | | | |
|---|---|---|---|
| 4,564,767 A | 1/1986 | Charych | |
| 4,673,825 A | 6/1987 | Raddi et al. | |
| 4,745,352 A * | 5/1988 | McGuire | 323/263 |
| 4,763,013 A | 8/1988 | Gvoth, Jr. et al. | |
| 4,791,348 A * | 12/1988 | McGuire et al. | 323/263 |
| 4,831,508 A | 5/1989 | Hunter | |
| 4,903,186 A | 2/1990 | Pullen, Jr. | |
| 4,916,329 A * | 4/1990 | Dang et al. | 307/66 |
| 5,075,617 A * | 12/1991 | Farr | 323/258 |
| 5,181,170 A * | 1/1993 | Huang et al. | 363/21.04 |
| 5,579,197 A | 11/1996 | Mengelt et al. | |
| 5,602,462 A * | 2/1997 | Stich et al. | 323/258 |
| 5,751,564 A | 5/1998 | Dien | |
| 5,946,202 A * | 8/1999 | Balogh | 363/26 |
| 6,137,277 A * | 10/2000 | Rajda et al. | 323/301 |
| 6,218,744 B1 | 4/2001 | Zahrte, Sr. et al. | |
| 6,274,950 B1 | 8/2001 | Gottlieb et al. | |
| 6,314,007 B2 * | 11/2001 | Johnson et al. | 363/37 |
| 6,348,782 B1 | 2/2002 | Oughton, Jr. et al. | |
| 6,353,547 B1 | 3/2002 | Jang et al. | |
| 6,356,467 B1 * | 3/2002 | Belehradek, Jr. | 363/24 |
| 6,404,658 B1 | 6/2002 | Reilly | |
| 6,429,629 B1 * | 8/2002 | Nguyen | 323/255 |
| 6,456,509 B1 | 9/2002 | Yasumura | |
| 7,141,892 B2 | 11/2006 | Dai et al. | |
| 7,184,287 B2 | 2/2007 | Ying et al. | |
| 7,405,544 B2 | 7/2008 | Yeh et al. | |
| 7,880,341 B2 * | 2/2011 | Shin | 307/130 |

(Continued)

OTHER PUBLICATIONS

International Search Report and Written Opinion for PCT/US2009/064144 mailed Jan. 6, 2010.

*Primary Examiner* — Adi Amrany
(74) *Attorney, Agent, or Firm* — Lando & Anastasi, LLP

(57) ABSTRACT

Aspects of the invention are directed to systems and method for limiting losses in an uninterruptible power supply. In one aspect, the present invention provides an uninterruptible power supply (UPS) comprising an input to receive input power having an input voltage, an output to provide output power having an output voltage, a neutral line, an automatic voltage regulation (AVR) transformer coupled to the input and the output of the UPS and having an input, an output, a core and at least one switch controllably coupled to at least one of the core, the input and the output, and a means for isolating the core of the AVR transformer from the neutral line when the input voltage is substantially equal to a defined output voltage.

23 Claims, 7 Drawing Sheets

U.S. PATENT DOCUMENTS

| | | |
|---|---|---|
| 2004/0036361 A1 | 2/2004 | Dai et al. |
| 2006/0146464 A1 | 7/2006 | Tan et al. |
| 2008/0036399 A1* | 2/2008 | Olson et al. .................. 315/308 |
| 2009/0179496 A1 | 7/2009 | Ho et al. |
| 2009/0289504 A1 | 11/2009 | Ho et al. |
| 2009/0290384 A1* | 11/2009 | Jungreis ......................... 363/17 |

* cited by examiner

SYSTEM AND METHOD FOR LIMITING LOSSES IN AN UNINTERRUPTIBLE POWER SUPPLY

BACKGROUND OF INVENTION

1. Field of Invention

At least one embodiment of the invention relates generally to a method and system for providing uninterruptible, regulated power to critical and/or sensitive loads. More specifically, at least one embodiment of the invention relates to the reduction of losses in an uninterruptible power supply due to an automatic voltage regulation transformer.

2. Discussion of Related Art

The use of an uninterruptible power system (UPS) to provide power to a critical load is known. Known uninterruptible power systems include on-line UPS's, off-line UPS's, line interactive UPS's as well as others. On-line UPS's provide conditioned AC power as well as back-up AC power upon interruption of a primary source of AC power. Off-line UPS's typically do not provide conditioning of input AC power, but do provide back-up AC power upon interruption of the primary AC power source. Line interactive UPS's are similar to off-line and on-line UPS's in that they still switch to battery power when a blackout occurs; however, when a power line sag or swell occurs, at least one type of line interactive UPS activates a tap switching voltage regulation circuit to stabilize the output voltage continuously, without consuming battery power. This allows equipment connected to the UPS to continue to operate through extended power line sags or swells without draining the battery. The tap switching voltage regulation circuit often includes an automatic voltage regulation (AVR) transformer.

SUMMARY OF THE INVENTION

In embodiments of the present invention, the problems associated with AVR transformer energy loss in a UPS are reduced by de-energizing the core of the transformer and preventing losses due to the AVR transformer when the AVR is not performing a regulation function.

In one aspect, the present invention features an uninterruptible power supply (UPS). The UPS may include an input to receive input power having an input voltage, an output to provide output power, a neutral line, and an automatic voltage regulation (AVR) transformer coupled to the input and the output of the UPS, the AVR transformer having an input, an output, a core, and at least one switch controllably coupled to at least one of the core, the input and the output. The UPS further comprises a bypass switch configured to selectively couple the core of the AVR transformer to the neutral line, and a controller configured to control the at least one switch of the AVR transformer and the bypass switch, wherein the controller is configured to control the bypass switch to isolate the core of the AVR transformer from the neutral line in a first mode of operation and to couple the core of the AVR transformer to the neutral line in a second mode of operation.

According to one or more aspects of the invention, the controller is configured to, in the first mode of operation, couple the at least one switch of the AVR transformer to the core and to at least one of the AVR transformer input and the AVR transformer output in a configuration to provide an output voltage of the AVR transformer that is equal to an input voltage of the AVR transformer.

According to one or more aspects of the invention, the UPS further comprises a DC voltage source and an inverter coupled to the DC voltage source, wherein the inverter is coupled to the input of the AVR transformer and is configured to provide regulated AC power to the AVR transformer. Also, according to one or more aspects of the invention, the DC voltage source includes a battery.

According to one or more aspects of the invention, the controller is configured to, in the second mode of operation, couple the at least one switch of the AVR transformer to the core and to at least one of the AVR transformer input and the AVR transformer output in a configuration to provide an output voltage of the AVR transformer that is greater than an input voltage of the AVR transformer by a first ratio.

According to one or more aspects of the invention, the controller is configured, in a third mode of operation, to control the bypass switch to couple the core of the AVR transformer to the neutral line and wherein the controller is further configured to couple the at least one switch of the AVR transformer to the core and to at least one of the AVR transformer input and the AVR transformer output in a configuration to provide an output voltage of the AVR transformer that is greater than the input voltage of the AVR transformer by a second ratio which is larger than the first ratio. Also, according to one or more aspects of the invention, the second ratio may be twice the first ratio.

According to one or more aspects of the invention, the controller is configured, in a fourth mode of operation, to control the bypass switch to couple the core of the AVR transformer to the neutral line and wherein the controller is further configured to couple the at least one switch of the AVR transformer to the core and to at least one of the AVR transformer input and the AVR transformer output in a configuration to provide an output voltage of the AVR transformer that is less than the input voltage of the AVR transformer by a third ratio. According to one or more aspects of the invention, the third ratio may be 1.15:1. Also, according to one or more aspects of the invention, the bypass switch is an electromagnetic switch. In addition, according to one or more aspects of the invention, the electromagnetic switch is a relay. According to one or more aspects of the invention, the relay is a single pole double throw relay or a single pole single throw relay.

In another aspect, the present invention features a method of providing stable power in an uninterruptible power supply (UPS) having an automatic voltage regulation (AVR) transformer, an input to received input power having an input voltage, an output to provide output power having an output voltage, and a neutral line, the AVR transformer having an input, an output and a core selectively coupled to the neutral line, the method comprising determining whether the input voltage to the UPS is within a specified tolerance, if the input voltage to the UPS satisfies a first condition, isolate the core of the AVR transformer from the neutral line and if the input voltage of the UPS satisfies a second condition, couple the core of the AVR transformer to the neutral line.

According to one or more aspects of the method, the method further comprises the act of configuring the AVR transformer to boost the output voltage of the UPS if the input voltage of the UPS is less than a specified tolerance and configuring the AVR transformer to reduce the output voltage of the UPS if the input voltage of the UPS is greater than a specified tolerance.

According to one or more aspects of the method; the act of isolating comprises an act of decoupling the core of the AVR transformer from the neutral line.

According to one or more aspects of the method, the method further includes at least one switch controllably coupled to at least one of the core, the input of the AVR transformer and the output of the AVR transformer, and a bypass switch configured to selectively couple the core of the AVR transformer to the neutral line, wherein the act of isolating further comprises the act of coupling the at least one switch to the core and one half cycle later, controlling the bypass switch to decouple the core from the neutral line, wherein the act of coupling the core to the neutral line further comprises the act of controlling the bypass switch to couple the core to the neutral line and one half cycle later, coupling the at least one switch to the core.

In another aspect, the present invention features a UPS. The UPS having an input to receive input power having an input voltage, an output to provide output power having an output voltage, a neutral line, and an AVR transformer coupled to the input and the output of the UPS and having an input, an output, a core and at least one switch controllably coupled to at least one of the core, the input and the output. The UPS further comprises a means for isolating the core of the AVR transformer from the neutral line when the input voltage is substantially equal to a defined output voltage.

According to one or more aspects of the invention, the at least one switch is selectively coupled, in a first mode of operation, to the core in a configuration to provide an output voltage of the AVR transformer that is equal to an input voltage of the AVR transformer.

According to one or more aspects of the invention, the UPS further comprises a DC voltage source coupled to an inverter and wherein the inverter is coupled to the AVR transformer and is configured to provide regulated AC power to the AVR transformer. Also, according to one or more aspects of the invention, the DC voltage source includes a battery.

According to one or more aspects of the invention, in a second mode of operation, the core of the AVR transformer is coupled to the neutral line and the at least one switch is selectively coupled to the core in a configuration that results in the output voltage of the AVR transformer being greater than the input voltage of the AVR transformer by a first ratio.

According to one or more aspects of the invention, in a third mode of operation, the core of the AVR transformer is coupled to the neutral line and the at least one switch is selectively coupled to the core in a configuration that results in the output voltage of the AVR transformer to be greater than the input voltage of the AVR transformer by a second ratio which is larger than the first ratio. Also, according to one or more aspects of the invention, the second ratio is twice the first ratio.

According to one or more aspects of the invention, in a fourth mode of operation, the core of the AVR transformer is coupled to the neutral line and the at least one switch is selectively coupled to the core in a configuration that results in the output voltage of the AVR transformer being smaller than the input voltage of the AVR transformer.

BRIEF DESCRIPTION OF DRAWINGS

The accompanying drawings are not intended to be drawn to scale, in the drawings, each identical or nearly identical component that is illustrated in various figures is represented by a like numeral. For purposes of clarity, not every component may be labeled in every drawing. In the drawings.

DETAILED DESCRIPTION

Figure 1:
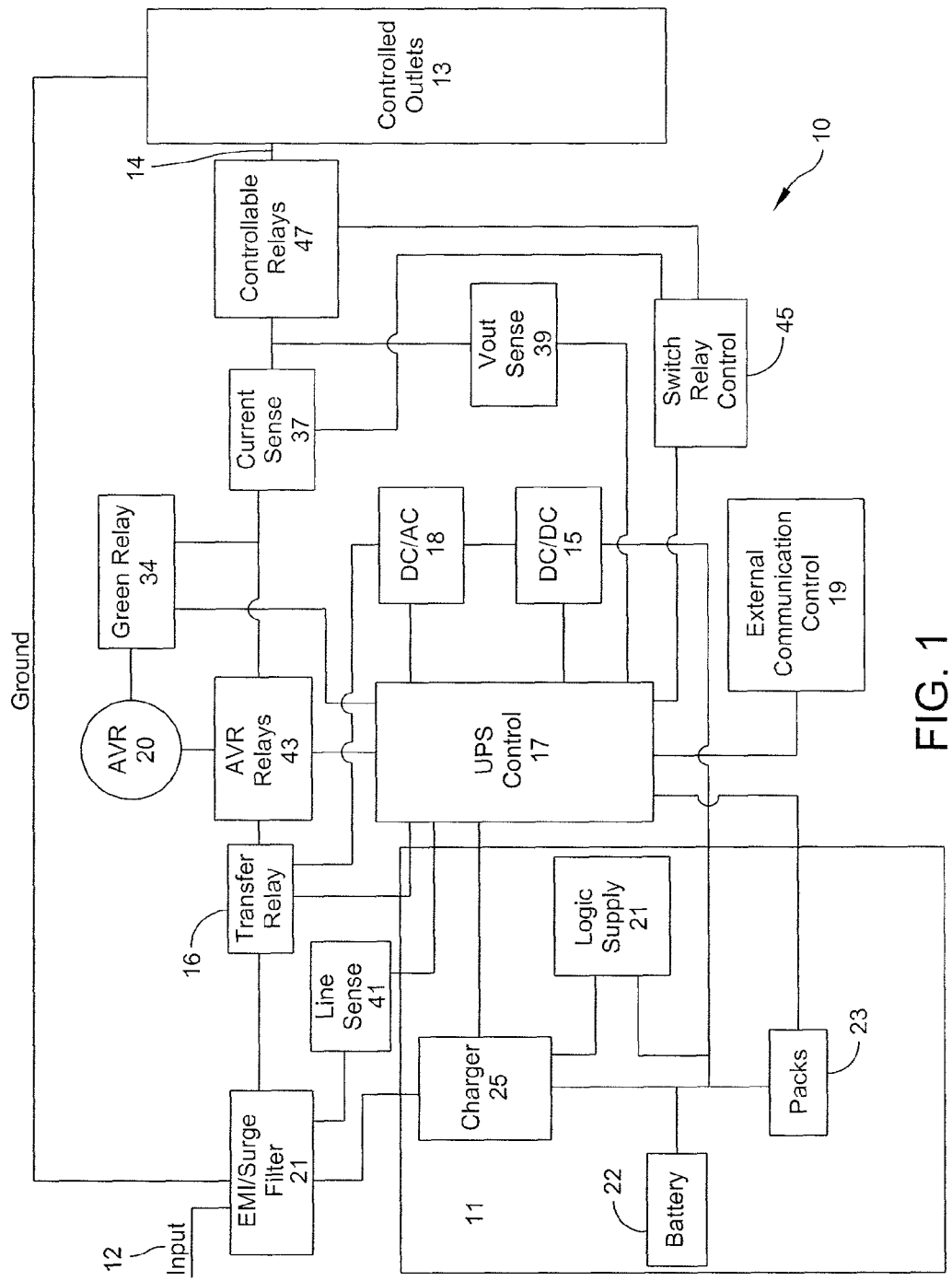
FIG. 1 is a block diagram of a line interactive uninterruptible power supply including an automatic voltage regulation transformer.

Embodiments of the invention are not limited to the details of construction and the arrangement of components set forth in the following description or illustrated in the drawings. Embodiments of the invention are capable of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

A drawback of utilizing an AVR transformer to stabilize a voltage at the output of a UPS is that an AVR transformer consumes energy even when not regulating the output voltage, which leads to energy losses in the transformer. In at least some embodiments of the present invention, the problems associated with AVR transformer energy loss in a UPS are eliminated by de-energizing the core of the transformer and preventing losses due to the AVR transformer when the AVR is not regulating the output voltage.

One embodiment of an uninterruptible power supply in accordance with the present invention will now be described with reference to FIG. 1 which shows a block diagram of a line interactive uninterruptible power supply (UPS) 10 for providing AC power to a load. The UPS includes an input 12 to receive AC power from an AC power source, an output 14 that provides AC power to at least one controlled outlet 13, a DC voltage source 11 coupled to a DC to DC converter 15, an inverter 18 operatively coupled to the DC to DC converter 15 to receive DC power and to provide AC power, a transfer relay 16 selectively coupled to the UPS input 12 and the inverter 18, a UPS controller 17, an external communication control circuit 19 for communicating with external devices, an EMI/Surge filter 21, and an automatic voltage regulation (AVR) transformer 20 coupled to a bypass relay 34, the transfer relay 16 and at least one AVR relay 43. The DC voltage source 11 includes a battery 22, at least one backup battery pack 23, a battery charger 25 and a logic supply 35. The UPS controller 17 is coupled to a current sense circuit 37, a voltage sense circuit 39, a line sense circuit 41, a switch relay control 45 and at least one controllable relay 47.

Figure 2:
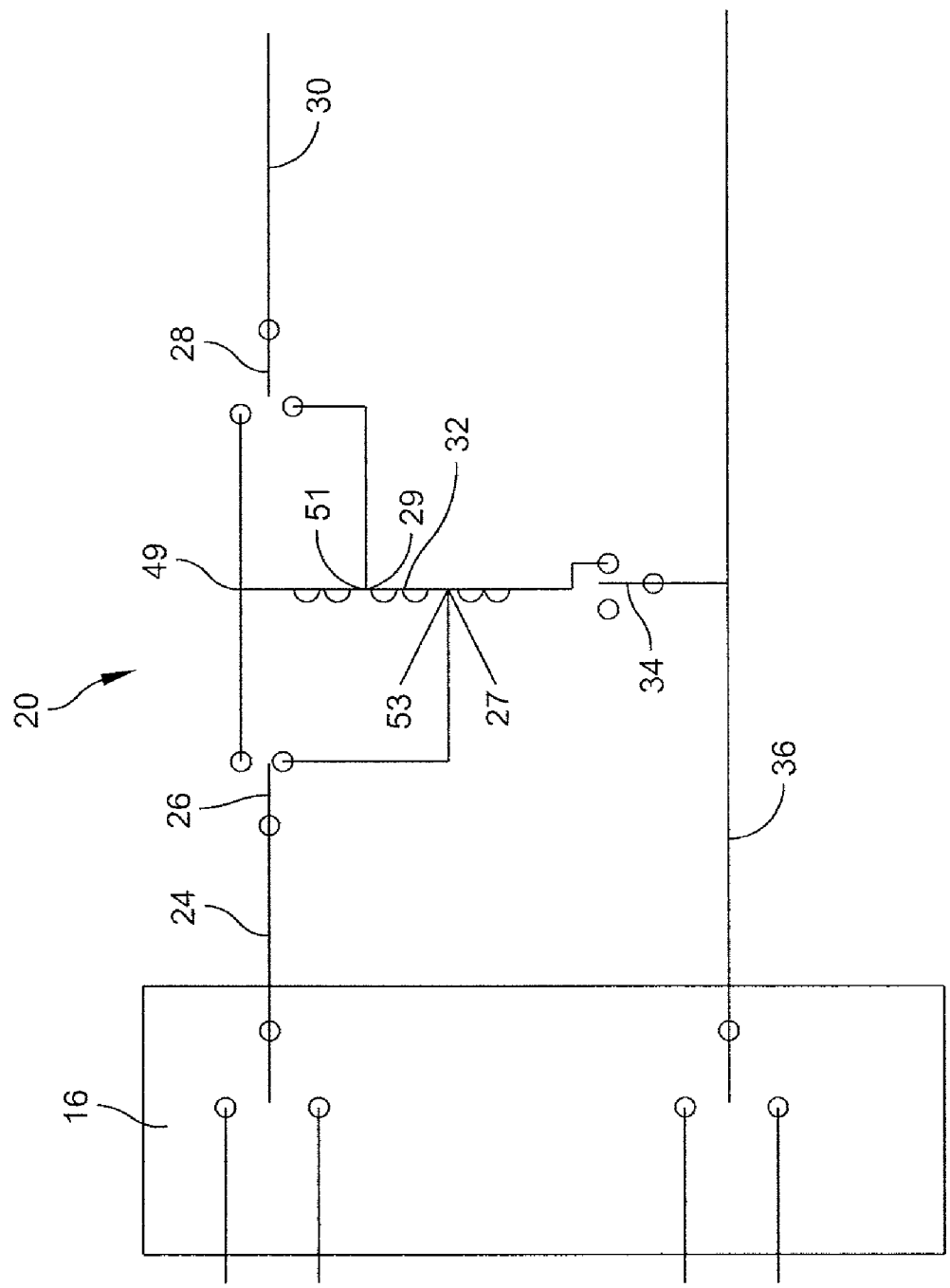
FIG. 2 is a schematic view of an automatic voltage regulation transformer included in a UPS in accordance with the present invention.

With reference to FIG. 2, which shows a schematic view of the automatic voltage regulation transformer, the AVR transformer 20 includes an input 24, an output 30, a core 32 including a top portion 49, a middle portion 51 and a bottom portion 53, a first AVR relay 26 selectively coupled between the input 24 and either the top portion 49 of the core 32 or a first tap 27 coupled to the bottom portion 53 of the core 32, a second AVR relay 28 selectively coupled between the output 30 and either the top portion 49 of the core 32 or a second tap 29 coupled to the middle portion 51 of the core 32, and a bypass relay 34 for decoupling the AVR transformer core 32 from a neutral line 36. The first AVR relay 26, the second AVR relay 28 and the bypass relay 34 may be single pole double throw (SPDT) relays. The bypass relay 34 may also be a single pole single throw (SPST) relay. A metal oxide varistor may also be coupled across the bypass relay 34 to absorb energy when the bypass relay 34 is opened.

The operation of the UPS 10 will now be described with reference to FIGS. 1-7. With reference to FIGS. 1-2, the UPS controller 17 monitors the status of the UPS 10 by reading the outputs of the voltage sense circuit 39, the current sense circuit 37 and the line sense circuit 41. In monitoring the outputs, the UPS controller may determine whether the input voltage to the UPS 10 is in a normal or abnormal condition. The input voltage is in an abnormal condition if the input voltage at the input 12 of the UPS 10 is in a blackout, sag, or swell condition. Irrespective of the input voltage, the UPS controller 17 operates the UPS 10 and the AVR transformer 20 so that the voltage at the output 30 is within predetermined values, i.e. a nominal value plus or minus a given threshold.

Figure 3:
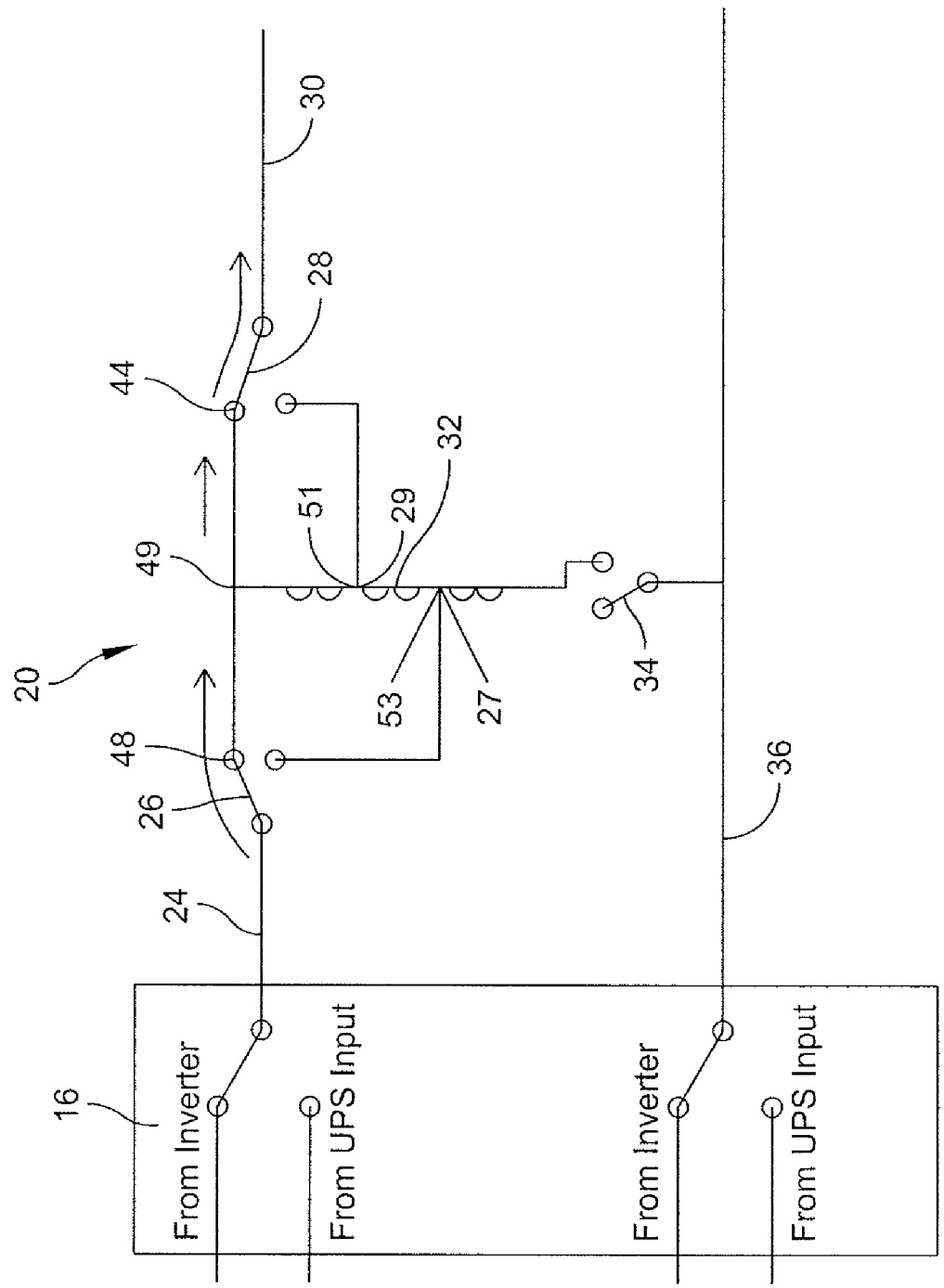
FIG. 3 is a schematic view of an automatic voltage regulation transformer in the inverter mode in accordance with the present invention.

For example, with reference to FIGS. 1 and 3, if the input voltage at the input 12 of the UPS 10 fails (blackout), the UPS controller 17 activates the transfer relay 16 to couple the AVR transformer 20 to the inverter 18 to receive voltage from the DC voltage source 11 instead of the input 12. DC power from the DC voltage source 11 is regulated by the DC to DC converter 15, which is controlled by the UPS controller 17. The regulated DC power from the DC/DC converter 15 is converted to AC power by the inverter 18 and output to the transfer relay 16 and AVR transformer 20. With reference to FIG. 3, which shows operation in inverter mode, the UPS controller 17 adjusts the AVR relays 26, 28 to an inverter mode in which the AVR transformer 20 is not required to perform an output voltage regulation function. The AVR transformer is not required to perform an output voltage regulation function because the DC voltage from the DC voltage source 11 is already regulated by the DC/DC converter 15 and DC/AC converter 18. In the pass through mode, the first AVR relay 26 is set in a second position 48 and the second AVR relay 28 is set in a second position 44 with both AVR relays 26, 28 coupled to the top portion 49 of the core 32 so that the taps 27, 29 are de-energized and the voltage at the output 30 of the AVR transformer 20 is equal to the voltage at the input 24 of the AVR transformer 20. Also, in the inverter mode, the bypass relay 34 is opened to decouple the core 32 of the AVR transformer from a neutral line 36 to eliminate any potential losses due to the AVR transformer 20. The UPS controller also operates a set of controllable relays 47, through a switch relay control 45, which determine which controlled outlets 13 will be connected to the output 14.

Figure 4:
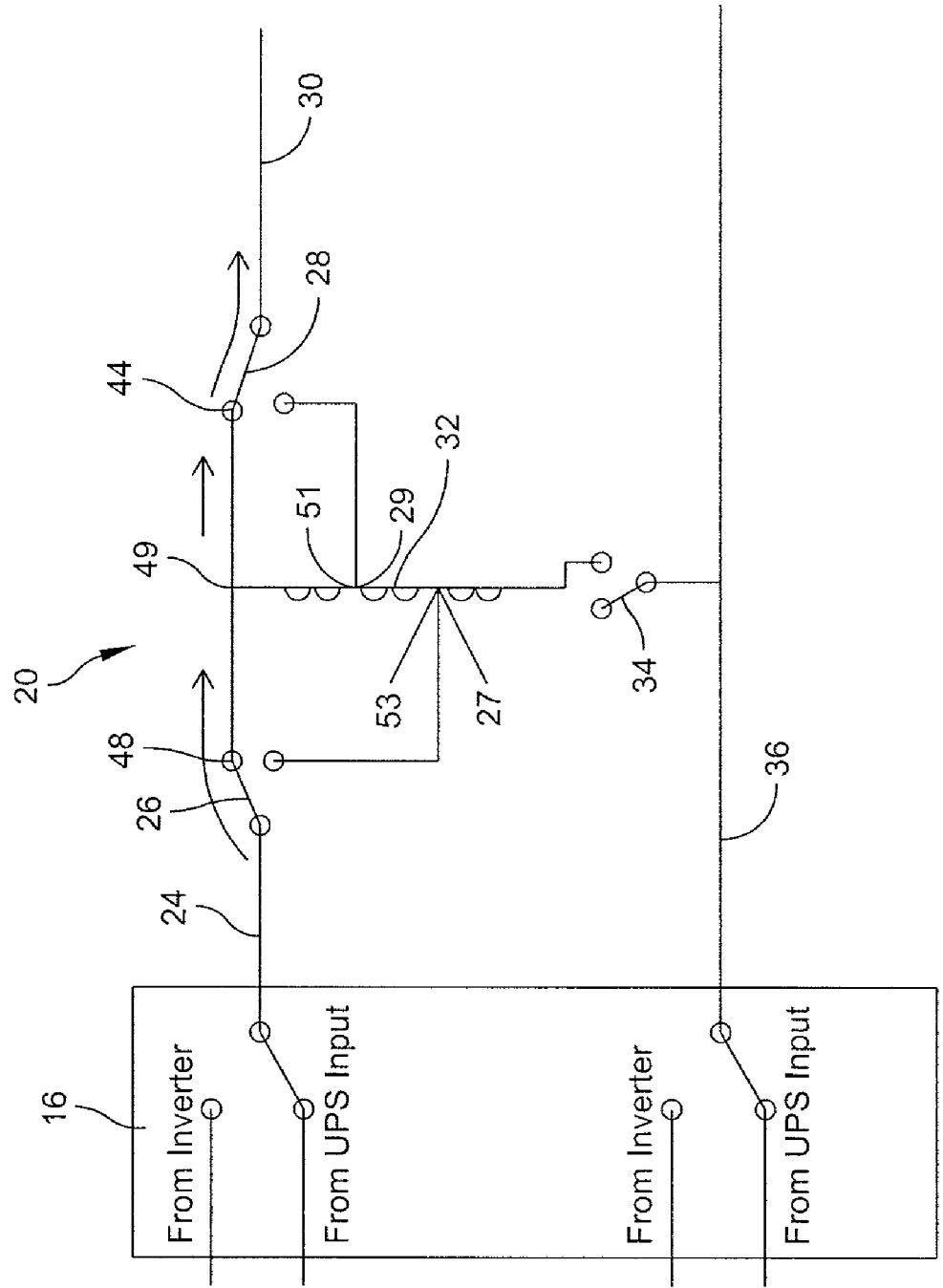
FIG. 4 is a schematic view of an automatic voltage regulation transformer in the pass through mode in accordance with the present invention.

In another example, with reference to FIGS. 1 and 4, if the input voltage at the input 12 of the UPS 10 is at a normal level and AVR transformer regulation is not required, the transfer relay 16 couples the AVR transformer 20 to the input of the UPS 10 and the UPS controller 17 adjusts the AVR relays 26, 28 to a pass through mode in which the AVR transformer 20 is not required to perform an output voltage regulation function. In the pass through mode, the first AVR relay 26 is set in a second position 48 and the second AVR 28 is set in a second position 44 with AVR relays 26, 28 coupled to the top portion 49 of the core 32, so that the taps 27, 29 are de-energized and the voltage at the output 30 of the AVR transformer 20 is equal to the voltage at the input 24 of the AVR transformer 20. Also, in the pass through mode, the bypass relay 34 is opened to decouple the core 32 of the AVR transformer from a neutral line 36 to eliminate any potential losses due to the AVR transformer 20.

If the input voltage is in a sag or swell condition, the transfer relay 16 couples the AVR transformer 20 to the input of the UPS 10 and the UPS controller 17 adjusts the AVR relays 26, 28, consequently activating or deactivating the corresponding taps 27, 29 to provide a stabilized voltage at the output 30 of the AVR transformer.

Figure 5:
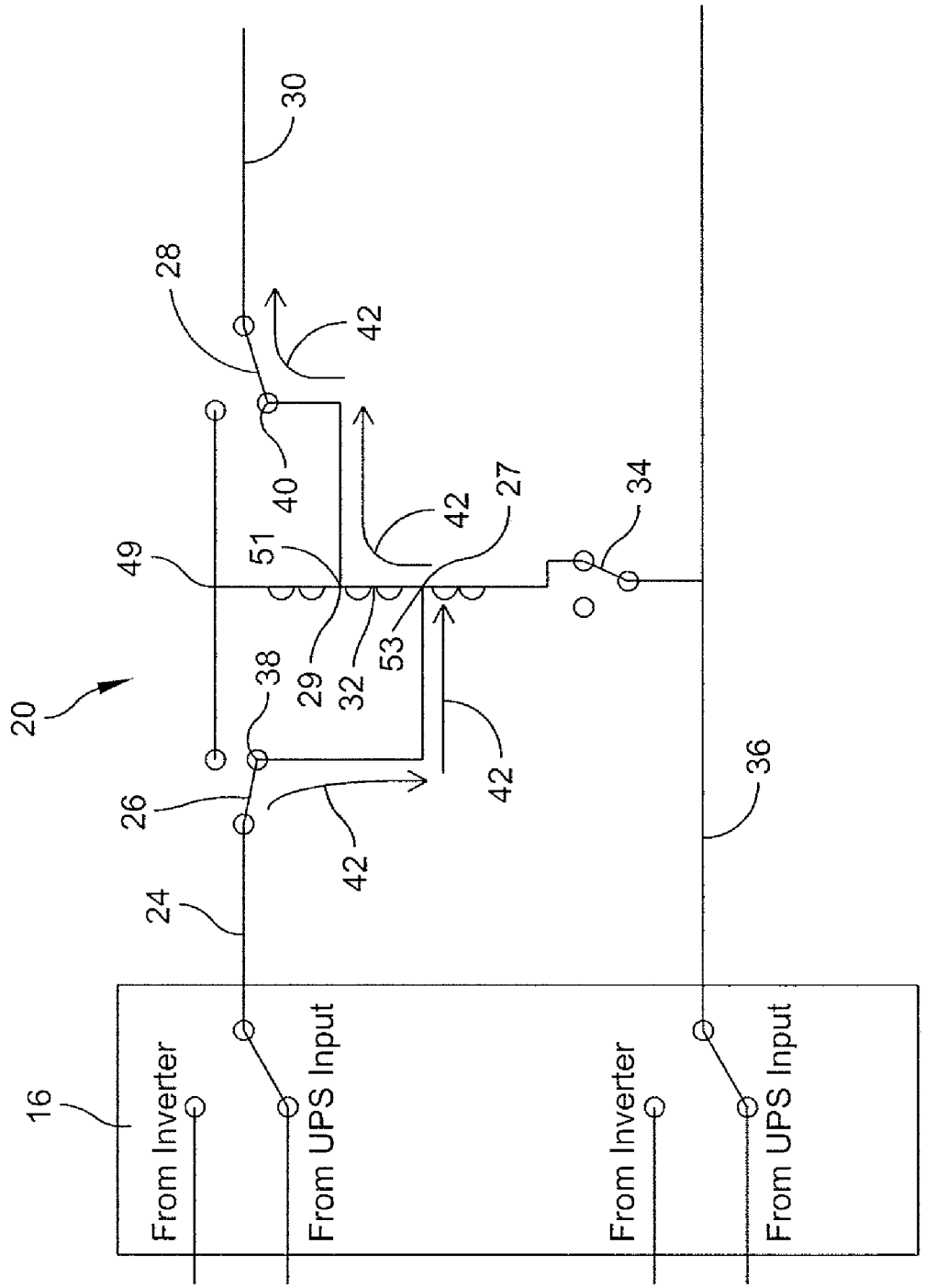
FIG. 5 is a schematic view of an automatic voltage regulation transformer in the boost mode in accordance with the present invention.

For example, with reference to FIG. 5, if the input voltage at the input 12 of the UPS 10 is in a sag condition and the output voltage needs to be increased, the UPS controller 17 adjusts the AVR relays 26, 28 to a boost mode. In the boost mode, the first AVR relay 26 of the AVR transformer 20, is set in a first position 38, coupled to the bottom portion 53 of the core 32, so that the first tap 27 is energized and the second AVR relay 28 of the AVR transformer 20 is set in a first position 40, coupled to the middle portion 51 of the core 32, so that the second tap 29 is energized, allowing the electrical current 42 at the input 24 of the AVR transformer 20 to flow from the bottom portion 53 of the core 32 to the middle portion 51 of the core in a first direction, resulting in the voltage at the output 30 of the AVR transformer 20 being greater than the voltage at the input 24 of the AVR transformer 20. The increase of voltage between the output 30 and input 24 due to the AVR transformer 20 is directly correlated to the turn ratio of the core 32 of the AVR transformer 20 which varies depending on where the core 32 is tapped (determined by the first and second AVR relays 26, 28 and corresponding taps 27, 29 of the AVR transformer 20). For example, in the boost mode, the voltage at the output of the AVR transformer may be increased, in relation to the voltage at the input of the AVR transformer, by a first ratio. The first ratio may be 1:1.15.

Figure 6:
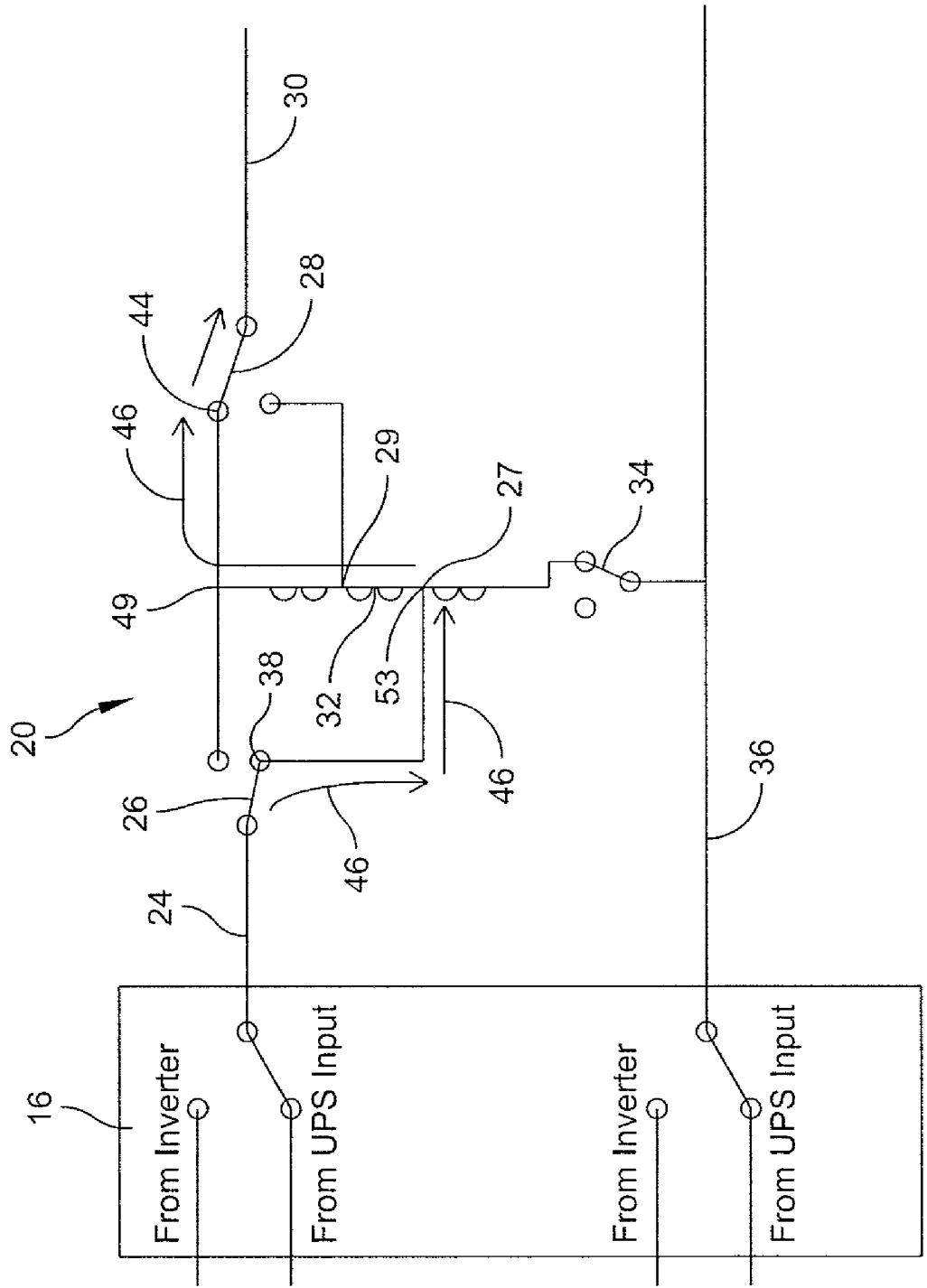
FIG. 6 is a schematic view of an automatic voltage regulation transformer in the double boost mode in accordance with the present invention.

With reference to FIG. 6, if the output voltage needs to be increased by a greater ratio, the second AVR relay 28 of the AVR transformer 20, can be put in a second position 44, coupled to the top portion 49 of the core 32, so that the second tap 29 is de-energized, allowing the current 46 to flow through a larger portion of the core 32, from the bottom portion 53 to the top portion 49, in the first direction, effectively increasing the turn ratio of the AVR transformer, and resulting in a larger voltage at the output 30. For example, in the boost mode, the voltage at the output of the AVR transformer may be increased by a second ratio which is greater than the first ratio. In one embodiment, the second ratio may be double the value of the first ratio. The second ratio may be 1:1.3.

Figure 7:
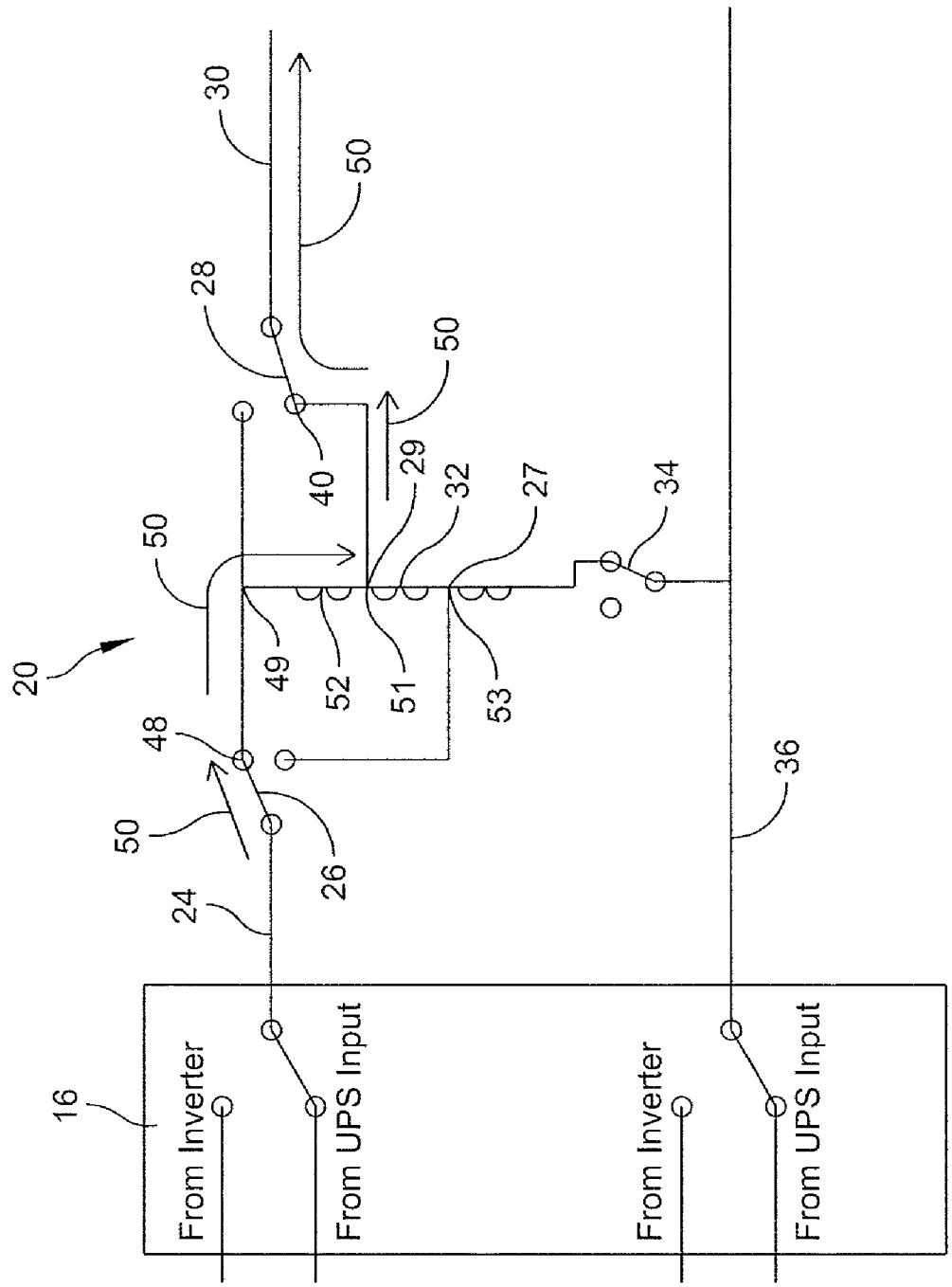
FIG. 7 is a schematic view of an automatic voltage regulation transformer in the trim mode in accordance with the present invention.

In another example, with reference to FIG. 7, if the input voltage at the input 12 of the UPS 10 is in an swell condition and the output voltage needs to be reduced, the transfer relay 16 couples the AVR transformer 20 to the input of the UPS 10 and the UPS controller 17 adjusts the AVR relays 26, 28 to a trim mode. In the trim mode, the first AVR relay 26 of the AVR transformer 20, is set in a second position 48, coupled to the top portion 49 of the core 32, so that the first tap 27 is de-energized, and the second AVR relay 28 of the AVR transformer 20, is set in a first position 40, coupled to the middle portion 51 of the core 32, so that the second tap 29 is energized, allowing the electrical current 50 at the input 24 of the AVR transformer 20 to flow through a section of the core 52 of the AVR transformer, from the top portion 49 to the middle portion 51, in a second direction, which results in the voltage at the output 30 of the AVR transformer 20 being lower than the voltage at the input 24 of the AVR transformer 20. The decrease of voltage between the output 30 and input 24 due to the AVR transformer 20 is directly correlated to the turn ratio of the core 32 of the AVR transformer 20. For example, in the trim mode, the voltage at the output of the AVR transformer may be decreased, in relation to the voltage at the input of the AVR transformer, by a ratio. The ratio may be 1.15:1.

When the AVR transformer core is transitioned from an energized to de-energized state or from a de-energized state to an energized state, it is beneficial in at least one embodiment to operate the AVR relays of the AVR transformer and the bypass relay in such a way to minimize any loss of volt-seconds or imbalance in the UPS. For example, in at least one embodiment the UPS controller 17 engages the bypass relay as close to the zero crossing of the AC voltage waveform as possible to minimize any loss of volt-seconds. Additionally, in at least one embodiment the UPS controllers 17 engages the bypass relays and the AVR relays exactly 180 degree apart to minimize any loss of volt-seconds or imbalance. For example, when the AVR transformer core is transitioned from a de-energized to an energized state, the bypass relay may be engaged first, followed by the AVR relays exactly one half cycle later. In another example, when the AVR transformer is transitioned from an energized to a de-energized state, the AVR relays may be engaged first, followed by the bypass relay exactly one half cycle later.

One advantage to at least one embodiment of the present invention described above is that the problems usually associated with AVR transformer energy loss in a UPS are reduced by de-energizing the core of the transformer and preventing losses due to the AVR transformer when the AVR is not performing a regulation function. By de-energizing the core, electric current is prevented from flowing in the core, which results in the elimination of any tare loss due to the AVR transformer when the ACR transformer is not performing a regulation function.

Embodiments of the invention are described above in conjunction with a line interactive UPS. The methods and systems described herein can also be used with other types of uninterruptible power supplies and in a variety of power supply systems and voltage regulation systems.

As described above, the systems and methods of embodiments of the invention utilize a plurality of different switches. The switches could be implemented in a variety of different ways such as, but not limited to, SPDT relays, SPST relays, transistors or other types of switches.

In at least one embodiment, the DC voltage supply 11 includes extra battery packs 23 to provide extra DC storage capacity, a battery charger for converting AC voltage from the input 12 into DC voltage to charge the battery 22 and backup battery packs 23, and a logic supply 21 for providing regulated DC voltages. In other embodiments, other backup power sources may be used including AC and DC generators.

In at least one embodiment the UPS controller 17 is connected to an external communication control circuit 19 to communicate with external devices.

In at least one embodiment the input 12 is connected to an EMI/Surge filter 21 to provide EMI and surge protection to the UPS 10.

In at least one embodiment, the controllable relays 47 are not included in the UPS and the controlled outlets 13 are not controlled outlets but are standard outlets.

As described above, the systems and methods of embodiments of the invention utilize a UPS controller. The UPS controller could be implemented in a variety of different ways such as, but not limited to, a microprocessor, logic circuit, computer or other type of electronic controller.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An uninterruptible power supply (UPS) system comprising:
    an input to receive input power having an input voltage;
    an output to provide output power;
    a neutral line;
    an automatic voltage regulation (AVR) transformer coupled to the input and the output of the UPS and having an input, an output, a core and a plurality of switches controllably coupled to at least one of the core, the input and the output;
    a bypass switch configured to selectively couple the core of the AVR transformer to the neutral line; and
    a controller configured to control the plurality of switches of the AVR transformer and the bypass switch,
    wherein the controller is configured to control the bypass switch to isolate the core of the AVR transformer from the neutral line in a first mode of operation and to couple the core of the AVR transformer to the neutral line in a second mode of operation, and
    wherein the controller is configured to, in the first mode of operation, couple a first one of the plurality of switches of the AVR transformer to the core and the AVR transformer input and a second one of the plurality of switches of the AVR transformer to the core and to the AVR transformer output in a configuration of the UPS to provide an output voltage of the AVR transformer that is equal to an input voltage at the input of the UPS.

2. The system of claim 1, further comprising a DC voltage source and an inverter coupled to the DC voltage source, wherein the inverter is coupled to the input of the AVR transformer and is configured to provide regulated AC power to the AVR transformer.

3. The system of claim 2, wherein the DC voltage source includes a battery.

4. The system of claim 1, wherein the controller is configured to, in the second mode of operation, couple the first one of the plurality of switches of the AVR transformer to the core and to the AVR transformer input and the second one of the plurality of switches of the AVR transformer to the core and to the AVR transformer output in a configuration of the UPS to provide an output voltage of the AVR transformer that is greater than an input voltage at the input of the UPS by a first ratio.

5. The system of claim 4, wherein the controller is configured, in a third mode of operation, to control the bypass switch to couple the core of the AVR transformer to the neutral line and wherein the controller is further configured to couple the first one of the plurality of switches of the AVR transformer to the core and to the AVR transformer input and the second one of the plurality of switches of the AVR transformer to the core and to the AVR transformer output in a configuration of the UPS to provide an output voltage of the AVR transformer that is greater than the input voltage at the input of the UPS by a second ratio which is larger than the first ratio.

6. The system of claim 5, wherein the second ratio is twice the first ratio.

7. The system of claim 4, wherein the controller is configured, in a fourth mode of operation, to control the bypass switch to couple the core of the AVR transformer to the neutral line and wherein the controller is further configured to couple the first one of the plurality of switches of the AVR transformer to the core and to the AVR transformer input and the second one of the plurality of switches of the AVR transformer to the core and to the AVR transformer output in a configuration of the UPS to provide an output voltage of the AVR transformer that is less than the input voltage at the input of the UPS.

8. The system of claim 1, wherein the bypass switch is an electromagnetic switch.

9. The system of claim 8, wherein the electromagnetic switch is a relay.

10. The system of claim 9, wherein the relay is a single pole double throw relay.

11. The system of claim 9, wherein the relay is a single pole single throw relay.

12. A method of providing stable power in an uninterruptible power supply (UPS) having an automatic voltage regulation (AVR) transformer, an input to receive input power having an input voltage with an AC voltage waveform, an output to provide output power having an output voltage, and a neutral line, the AVR transformer having an input, an output and a core selectively coupled to the neutral line, the method comprising:
 determining whether the input voltage to the UPS is within a specified tolerance;
 if the input voltage to the UPS satisfies a first condition, isolate the core of the AVR transformer from the neutral line in a first mode of operation;
 if the input voltage of the UPS satisfies a second condition, couple the core of the AVR transformer to the neutral line in a second mode of operation; and
 configuring, in the first mode of operation, the AVR transformer to provide output voltage that is equal to the input voltage at the input of the UPS.

13. The method of claim 12, further comprising acts of:
 configuring, in the second mode of operation, the AVR transformer to boost the output voltage of the UPS if the input voltage of the UPS is less than a specified tolerance; and
 configuring, in the second mode of operation, the AVR transformer to reduce the output voltage of the UPS if the input voltage of the UPS is greater than a specified tolerance.

14. The method of claim 12, wherein the act of isolating comprises an act of decoupling the core of the AVR transformer from the neutral line.

15. The method of claim 12, wherein the AVR transformer includes a first switch controllably coupled to the core and the input of the AVR transformer, a second switch controllably coupled to the core and the output of the AVR transformer, and a bypass switch configured to selectively couple the core of the AVR transformer to the neutral line,
 wherein the act of isolating further comprises an act of coupling the first switch and the second switch to the core and one half cycle later, controlling the bypass switch to decouple the core from the neutral line,
 wherein the act of coupling the core to the neutral line further comprises an act of controlling the bypass switch to couple the core to the neutral line and one half cycle later, coupling the first switch and the second switch to the core.

16. The method of claim 15, wherein the act of controlling the bypass switch to decouple the core from the neutral line comprises an act of opening the bypass switch at a zero crossing of the AC voltage waveform, and
 wherein the act of controlling the bypass switch to couple the core to the neutral line comprises an act of closing the bypass switch at a zero crossing of the AC voltage waveform.

17. An uninterruptible power supply (UPS) system comprising:
 an input to receive input power having an input voltage;
 an output to provide output power having an output voltage;
 a neutral line;
 an automatic voltage regulation (AVR) transformer coupled to the input and the output of the UPS and having an input, an output, a core and a plurality of switches controllably coupled to at least one of the core, the input and the output; and
 means for isolating the core of the AVR transformer from the neutral line, in a first mode of operation;
 wherein the plurality of switches are selectively coupled, in the first mode of operation, to the core in a configuration of the UPS to provide an output voltage of the AVR transformer that is equal to the input voltage at the input of the UPS.

18. The system of claim 17, further comprising a DC voltage source coupled to an inverter and wherein the inverter is coupled to the AVR transformer and is configured to provide regulated AC power to the AVR transformer.

19. The system of claim 18, wherein the DC voltage source includes a battery.

20. The system of claim 17, wherein, in a second mode of operation, the core of the AVR transformer is coupled to the neutral line and the plurality of switches are selectively coupled to the core in a configuration of the UPS that results in the output voltage of the AVR transformer being greater than the input voltage at the input of the UPS by a first ratio.

21. The system of claim 17, wherein, in a third mode of operation, the core of the AVR transformer is coupled to the neutral line and the plurality of switches are selectively coupled to the core in a configuration of the UPS that results in the output voltage of the AVR transformer being greater than the input voltage at the input of the UPS by a second ratio which is larger than the first ratio.

22. The system of claim 21, wherein the second ratio is twice the first ratio.

23. The system of claim 17, wherein, in a fourth mode of operation the core of the AVR transformer is coupled to the neutral line and the plurality of switches are selectively coupled to the core in a configuration of the UPS that results in the output voltage of the AVR transformer being smaller than the input voltage at the input of the UPS.

* * * * *